Patented June 8, 1926.

1,587,622

UNITED STATES PATENT OFFICE.

CYRUS FIELD WILLARD, OF SAN DIEGO, CALIFORNIA.

PROCESS OF TREATING RESINS AND THE PRODUCT THEREOF.

No Drawing. Application filed May 21, 1924. Serial No. 714,887.

The present invention relates to a process for treating resins and the product thereof for use in paint, enamel oils, varnishes and other products by the addition of rubber thereto in such a manner as will give to the resin some of the elasticity and resiliency of rubber and will take away its tendency to splinter, crack, saponify and deteriorate under exposure to the weather. This rubber may be any kind of crude unvulcanized rubber but by preference on account of its far greater cheapness I prefer to use the rubber which has been devulcanized with an emulsoid colloid solution and a sulfur solvent in accordance with processes covered by U. S. Patents, Nos. 1,322,077; 1,322,151 and 1,322,152, issued to me on Nov. 18, 1919, as well as that covered by application for Letters Patent, Serial No. 675,712 filed Nov. 19, 1923.

It is known that rosin, colophony or other resins when melted with 10% by weight of glycerol in the presence of a suitable catalyst will form a rosin or resin ester gum, the glyceryl radicles displacing some of the hydrogen molecules in the abietic acid of the rosin, thus rendering it more or less neutral in character and less liable to saponify and deteriorate when exposed to the influences of the weather. This rosin glycerine ester gum is largely used in the manufacture of outside varnishes, especially in conjunction with linseed or wood oil, and other purposes, on account of its superior wearing and weather resisting qualities and because such varnishes, on account of their low acidity, do not thicken or "liver up" with zinc oxide, a property which is of extreme importance in the manufacture of enamel paints.

Such resin ester gums do not, however, make as good a varnish as the hard resins or fossil gums, which have a high melting point and form a very hard and yet elastic varnish, which varnishes are generally composed of a resin or gum, a drying oil and a volatile solvent, or it may be a spirit varnish composed only of a resin and a volatile solvent.

Most of these varnishes and enamel oils (added to paints to give an enamel finish) dry off quickly with a hard, yet brittle highly lustrous surface or "face" and are not in consequence durable enough to withstand severe outside exposure and weathering influences.

The hard resins or fossil gums are very costly and the supply is constantly diminishing and more and more the manufacturers of varnishes and enamel oils are turning to resin gum esters as a basis for the manufacture of their products.

While the treating of the rosin with glycerol to make a resin gum ester has been a great improvement yet the resultant product still possesses some of the peculiar characteristics of rosin. This is removed by treating it with any form of rubber so as to make a hard, yet very elastic, resin or gum which will make either a very fine varnish, or enamel oil to be added to paint for the purpose of giving a hard, elastic and weather-proof enamel surface or as a gum which can be used for any other purpose for which gum is used.

The first step in my process for treating rosin to make a resin ester gum is to melt up in a suitable vessel the resin with 10%, more or less by weight, of glycerol, and 3%, more or less of ferric oxide ($Fe_2O_3$) as a catalyst with about 7 to 15% more or less of rubber, dissolved by any rubber solvent so as to be a semi-solid or gelatinous mass, using by preference the devulcanized rubber produced according to the patents and application above cited until the glycerol and rubber has united with the resin to make a resin ester gum. This elastic gum ester may be used to make varnish, enamel paint, enamel oil and used for many other purposes besides those specified.

In the treatment of the rosin for making an elastic rosin ester gum, the effect is produced on the rosin by treating the rosin with rubber for the purpose of imparting elasticity and resiliency to a hard, yet brittle, resin or gum which without such treatment with rubber would not stand as well the necessary exposure to the elements nor possess the desired qualities of elasticity and resiliency.

Rubber when in a crude state or when devulcanized by my process is not much affected by ordinary alkalies and the abietic acid of the resin being neutralized to a large extent by the glycerol in this process, the rubber film makes the resin a firm, hard, neutral and elastic surface on which alkalies only act to remove any trace of acid or sulfur, thus prolonging the life of the film.

What I claim as new and desire to secure by Letters Patent is:

1. The process of treating resin which comprises heating the resin in a suitable vessel with glycerol, dissolved rubber and a suitable catalyst until the resin is melted and the rubber and glycerol in the presence of the catalyst have united with the resin to make a resin gum ester.

2. The process of treating resin which comprises heating 100 parts of resin in a suitable vessel with 10 parts of glycerol, 7 to 15 parts of dissolved rubber and 2 parts of ferric oxide, until the resin is melted and the rubber and glycerol have united with the resin to form a resin ester gum.

3. The process of treating resin which comprises heating the resin in the presence of a catalyst in a suitable vessel, with glycerol and dissolved devulcanized rubber until the resin has melted and the glycerol and dissolved devulcanized rubber have united with the resin to make a resin gum ester.

4. The process of treating resin which comprises melting the resin with glycerol and rubber in the presence of a suitable catalyst to make a resin gum ester and then using the resin gum ester so obtained to make a varnish, enamel paint or enamel oil for paint, or for any other purpose for which such gum might be used, as described and specified.

5. The product obtained by heating resin in a suitable vessel with glycerol, rubber and a suitable catalyst until the resin is melted and the rubber and glycerol in the presence of the catalyst have united with the resin to make a resin gum ester.

CYRUS FIELD WILLARD.